(12) United States Patent
Mazzucco et al.

(10) Patent No.: US 6,407,610 B2
(45) Date of Patent: Jun. 18, 2002

(54) CIRCUIT AND A METHOD FOR EXTENDING THE OUTPUT VOLTAGE RANGE OF AN INTEGRATOR CIRCUIT

(75) Inventors: Michelangelo Mazzucco, Santa Maria Del Tempio; Vanni Poletto, Casale Monferrato; Melano Carlo Lorenzo Protti, Pavia, all of (IT)

(73) Assignees: STMicroelectronics S.r.l., Agrate Brianza; Magneti Marelli S.p.A., Milan, both of (IT)

( * ) Notice: Subject to any disclaimer, the term of this patent is extended or adjusted under 35 U.S.C. 154(b) by 0 days.

(21) Appl. No.: 09/751,927

(22) Filed: Dec. 29, 2000

(30) Foreign Application Priority Data

Dec. 30, 1999 (EP) .............................................. 99830814

(51) Int. Cl.$^7$ ................................................ G06F 7/64
(52) U.S. Cl. ........................................ 327/336; 327/344
(58) Field of Search ............................... 327/100, 334, 327/336, 337, 344

(56) References Cited

U.S. PATENT DOCUMENTS

| 4,153,020 A | 5/1979 | King et al. ............. 123/117 R |
| 4,567,465 A | * 1/1986 | Komiya ............... 340/347 AD |
| 4,739,305 A | * 4/1988 | Naito .................. 340/347 AD |
| 5,646,491 A | * 7/1997 | Erdman et al. ............. 318/254 |

FOREIGN PATENT DOCUMENTS

GB          2310496          8/1997

* cited by examiner

*Primary Examiner*—Kenneth B. Wells
(74) *Attorney, Agent, or Firm*—Lisa K. Jorgenson; Allen, Dyer, Doppelt, Milbrath & Gilchrist, P.A.

(57) ABSTRACT

A circuit extends the output voltage range of an integrator circuit wherein the input signal is used to produce an output signal, and the voltage of the output signal develops monotonically within a predetermined range of possible values. The integrator circuit is driven within an integration time period such that each time the signal at its output reaches a limit of the range of values, the integrator circuit starts a subsequent integration stage of the input signal in which the output signal develops again within the above-mentioned range. This takes place by resetting the integrator circuit or by a reversal of the characteristic slope of the output signal. This is combined with storing the number of occasions on which these interventions have occurred as determined by a scounter. This enables the actual voltage value of the signal resulting from the integration to be calculated by a relatively straightforward mathematical operation from the reading of the counter, and from the signal currently present at the output of the integrator at the end of the integration period.

33 Claims, 5 Drawing Sheets

CIRCUIT AND A METHOD FOR EXTENDING THE OUTPUT VOLTAGE RANGE OF AN INTEGRATOR CIRCUIT

FIELD OF THE INVENTION

The present invention relates to a circuit and to a method for extending the range of the output voltage of an integrator circuit beyond its supply voltage. More particularly, the present invention relates to a circuit of this type associated with an integrator circuit used in automotive applications, and, more specifically, in detecting knocking in internal combustion engines.

BACKGROUND OF THE INVENTION

In a system for detecting knocking in an internal combustion engine, one or more wide-band accelerometric knock sensors are provided, and advantageously are disposed on the engine block in the vicinity of the cylinders. These sensors register variations in pressure on the cylinder walls and translate them into electrical signals which are processed in a control unit to distinguish the pressure contributions due to knocking from those relating to operation with correct combustion.

During this processing, the electrical signal coming from the sensor is amplified and filtered, and after being rectified, is sent to an integration stage which outputs a voltage signal. This voltage signal is proportional to the energy of the initial electrical signal, is within the filtering band, and is proportional to the integration period.

At the end of the integration period, the value of the voltage signal reached by an integrator circuit of the integration stage is stored, for example, in a sample/hold circuit and made available as an output to further processing stages. These further processing stages are arranged to identify the occurrence of knocking from the value of this signal and to provide feedback control to a system controlling ignition in the engine.

It can easily be understood that the value of the voltage signal output by the integrator circuit may reach high levels if the integration time is long. Conventional integrator circuits formed with operational amplifiers and capacitive feedback components have a maximum limit for their output voltage, which may increase or decrease monotonically within the integration time period. This limit cannot be passed and is determined by the supply voltage supplied to the circuit, or by the supply voltages if there are two, that is, one positive and one negative.

When an operational amplifier is required to have an output voltage close to or greater than this limit, it ceases to operate linearly and reaches a saturation condition in which the voltage no longer increases (decreases) as the integration time passes. Instead, the voltage adopts a maximum (minimum) limit value which is substantially constant and is within the limits imposed by the supply voltage.

The approaches according to the prior art, which are referred to in the technical literature as "rail-to-rail" circuits, do not provide for these limits to be exceeded, but only to be approached as closely as possible.

SUMMARY OF THE INVENTION

An object of the present invention is to provide a system which enables the range of the output voltage of an integrator circuit to be artificially extended beyond the limits imposed by the supply voltage.

A circuit for extending an output voltage range of an integrator circuit that receives an input signal for providing an output signal having a voltage that develops monotonically within a range of values is provided. The circuit preferably comprises a control circuit connected to the integrator circuit for control thereof so that the integration circuit starts a subsequent integration of the input signal within an integration time period each time a voltage of the output signal reaches a limit of the range of values.

A counter is preferably connected to the control circuit for counting a number of times the voltage of the output signal covers the limit of the range of values. An actual voltage of the output signal at the end of the integration time period is calculated based upon a final voltage of the output signal at the end of the integration time period, and from the number of times the output signal covers the limit of the range of values.

In summary, the present invention is based on the principle of monitoring the development of the voltage signal generated by an integrator circuit according to the prior art and resetting the circuit (or, in an alternative embodiment, reversing the characteristic slope of the output signal) each time its output voltage reaches a predetermined limit close to the saturation condition.

This is combined with the step of memorizing the number of occasions on which these interventions have occurred by using a counter which is connected to the integrator circuit, and which is incremented each time the integrator is reset (or the slope of the output signal is reversed).

At the end of the predetermined integration period, the content of the counter will thus indicate how many times the voltage signal generated by the integrator has covered the entire range naturally available during its increasing or decreasing development. This will enable the actual voltage value of the signal resulting from the integration to be calculated by a simple mathematical operation from the reading of the counter and from the signal currently present at the output of the integrator, as will be described further in the following examples.

The embodiment according to the present invention thus enables a substantially unlimited, although fictitious, output voltage range to be provided in an integrator circuit. In a circuit of the type used, for example, in control systems for detecting the degree of knocking in internal combustion engines, this enables simpler control systems to be produced. These control systems are advantageously produced which operate from a single voltage supply (for example, 5V) both for the active elements of the integrator circuit and for the logic circuits, and any micro-controllers present in the engine electronic control unit.

A further advantage is that the integration period can be extended at will and more efficient engine control algorithms can be established. The greater efficiency achieved enables an engine of the same type to have lower consumption and greater power than with current approaches.

BRIEF DESCRIPTION OF THE DRAWINGS

Further characteristics and advantages of the invention will be explained in greater detail in the following detailed description of different embodiments thereof, given by way of non-limiting examples, with reference to the appended drawings, in which.

DETAILED DESCRIPTION OF THE PREFERRED EMBODIMENTS

Figure 1:
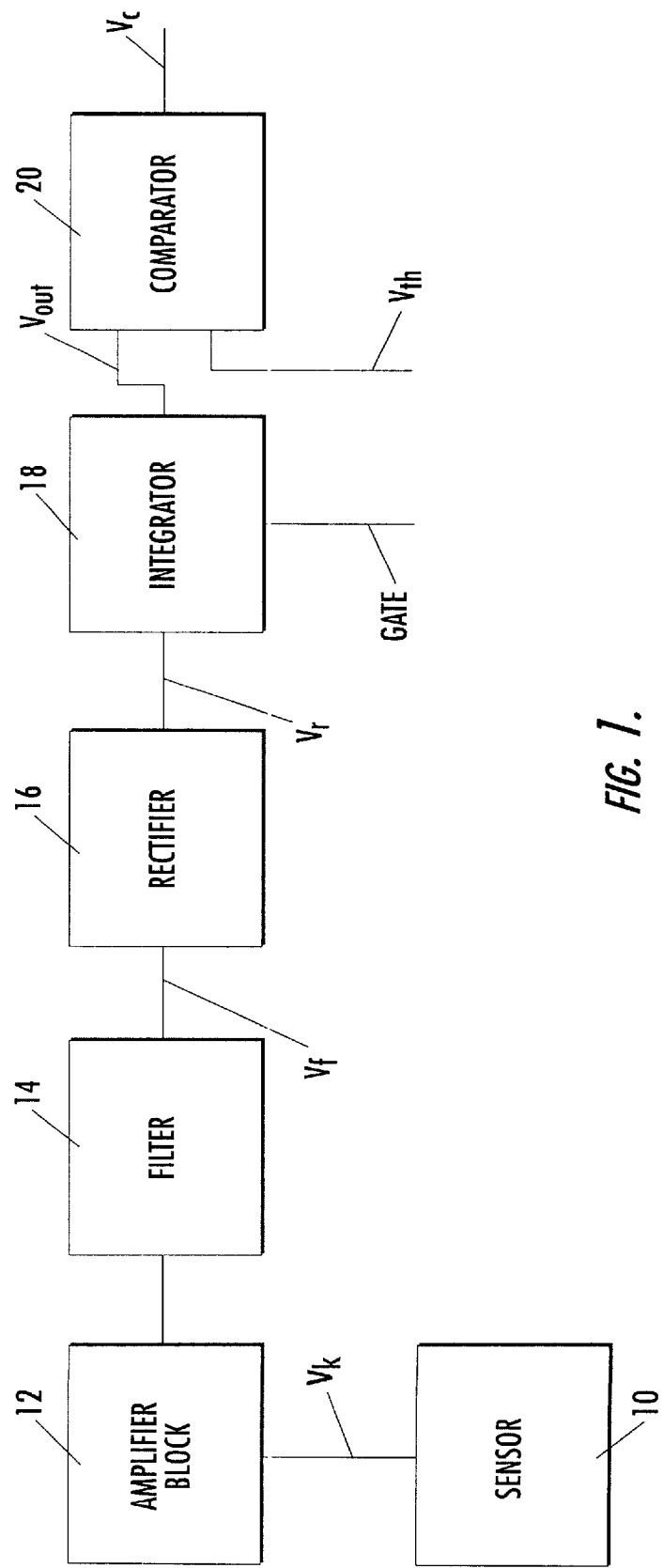
FIG. 1 is a block diagram of a system for detecting knocking in an internal combustion engine according to the present invention.

In a system for detecting knocking in an internal combustion engine, a wide-band accelerometric knock sensor 10 is disposed on the engine block in the vicinity of the cylinders. The sensor 10 registers variations in pressure on the walls of the cylinders and translates them into an electrical voltage signal, which is indicated as $V_k$ in the circuit diagram of FIG. 1 and is proportional to the acoustic energy detected.

An amplifier block 12 is coupled to the sensor 10 and receives and amplifies the signal $V_k$. A band-pass filter 14 previously tuned to the characteristic knock frequency of the engine in question is downstream of the amplifier block 12. The amplified and filtered voltage signal $V_F$ is a signal proportional to the amplitude of the knocking alone. A rectifier stage 16 is downstream of the filter 14 and has an output voltage signal $V_r$ substantially corresponding to the envelope of the signal $V_F$.

An integration stage 18 is coupled to the output of the rectifier stage 16 by a first input (or signal input) and has its output connected to a first input of a comparator circuit 20. The output of the comparator circuit 20 corresponds to the output of the knocking detection system as a whole.

The integration stage 18 comprises a conventional operational-amplifier integrator circuit 22, a circuit for extending the output voltage range of the integrator circuit, and a sample/hold circuit 24. The sample/hold circuit 24 is for the temporary storage of the voltage value reached at the output of the integrator circuit 22 at the end of the integration period. This value is proportional to the knock energy.

When the system is in operation, the signal $V_r$ output by the rectifier stage 16 is integrated within a predetermined period of time $T_i$ to derive an output signal $V_{out}$. The integration period $T_i$ is determined by a control logic signal GATE supplied to a second input (or control input) of the integration stage 18 so as to correspond to the period of time in which the intensity of knocking is greater than the background noise. The selection of the duration of this period of time determines the efficiency of the knocking detection.

The comparator circuit 20 has a second input which receives a reference signal $V_{th}$ indicative of a knock intensity threshold, and is arranged to emit an output signal $V_c$ indicative of the occurrence of knocking. As is well known to one skilled in the art, this signal may be made available to a circuit controlling ignition advance in a conventional closed-loop system.

Figure 2:
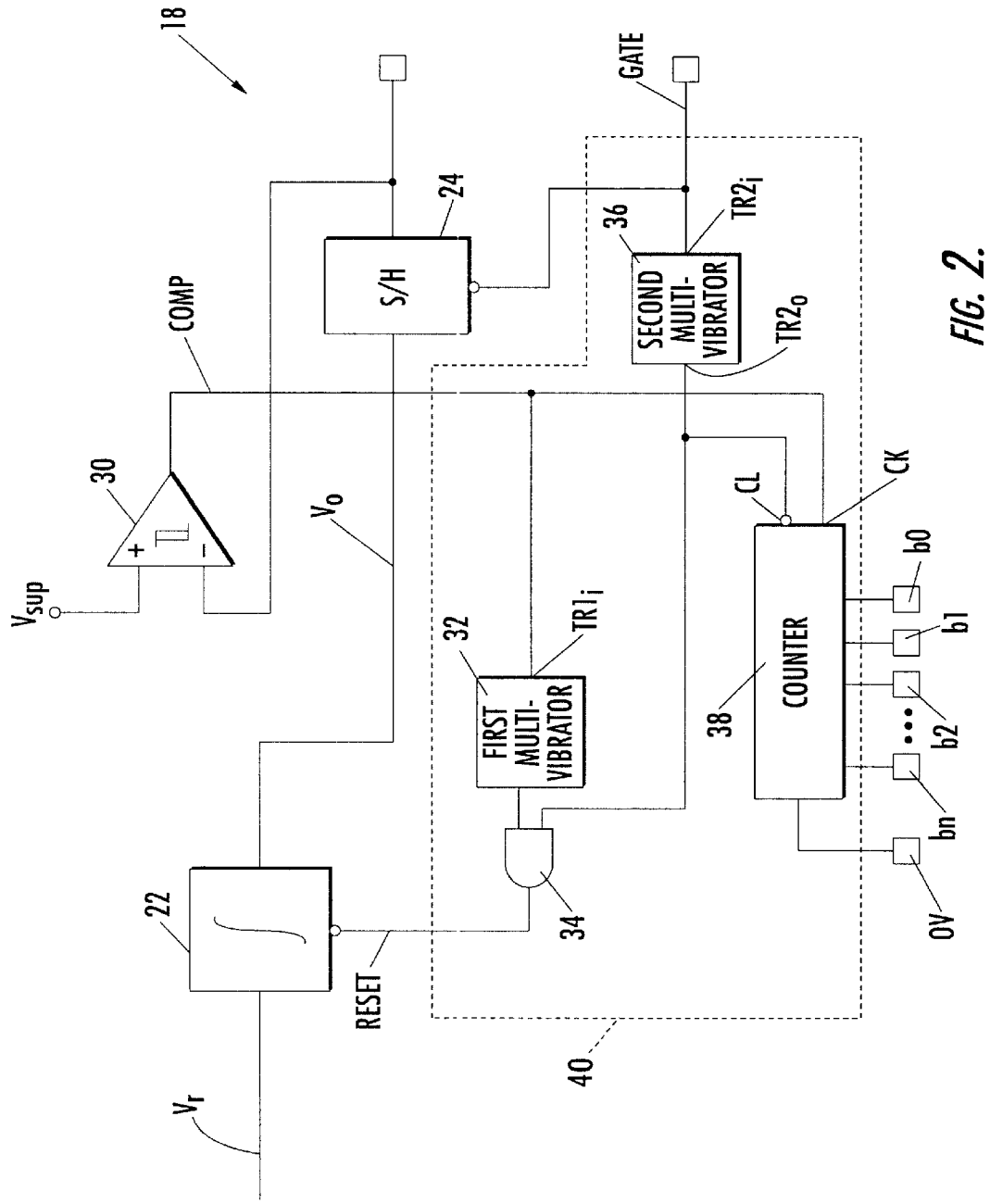
FIG. 2 is a circuit diagram of a first embodiment of an integration circuit stage comprising a circuit according to the present invention.

A first embodiment of an integration stage 18 according to the invention is described in detail with reference to FIG. 2. The integrator circuit 22 receives the rectified voltage signal $V_r$ by a first input (or signal input) of the integration stage 18, and has its output coupled to the sample/hold circuit 24. The control input of the sample/hold circuit 24 receives the control logic signal GATE from the second input (or control input) of the integration stage.

The output of the sample/hold circuit 24, at which the output signal $V_o$ is produced by the integrator circuit 22, is connected to the inverting input of a threshold comparator 30. The non-inverting input of the threshold comparator 30 receives a reference voltage $V_{sup}$. The function of the comparator 30 is to detect when the voltage of the signal $V_o$ exceeds the value $V_{sup}$.

The output of the threshold comparator 30 is connected to the control input $TR1_i$ of a first monostable multivibrator 32, the transition of which from the stable state to the quasi-stable state is induced by the trailing edge of the signal output by the comparator. The multivibrator 32 in turn is coupled to a resetting input of the integrator circuit 22 by an AND logic gate 34.

The control logic signal GATE is present at the control input $TR2_i$ of a second monostable multivibrator 36, the transition of which from the stable state to the quasi-stable state is induced by the leading edge of the signal GATE. The output $TR2_o$ of the multivibrator 36 is also coupled to the resetting input of the integrator circuit 22 by the AND logic gate 34.

A counter 38 is coupled to the output $TR2_o$ of the second multivibrator 36 by its own resetting input CL, and has its own drive input CK coupled directly to the output of the comparator 30. The increment of the counter is induced by the trailing edge of the signal present at the drive input. A plurality of output terminals b0, b1, . . . , bn, and OV is provided for presenting the content of the counter and for indicating a possible overflow condition thereof, respectively. The monostable multivibrators 32, 36 and the counter 38 are together indicated as the control circuit 40 of the integrator circuit 22.

Figure 3:
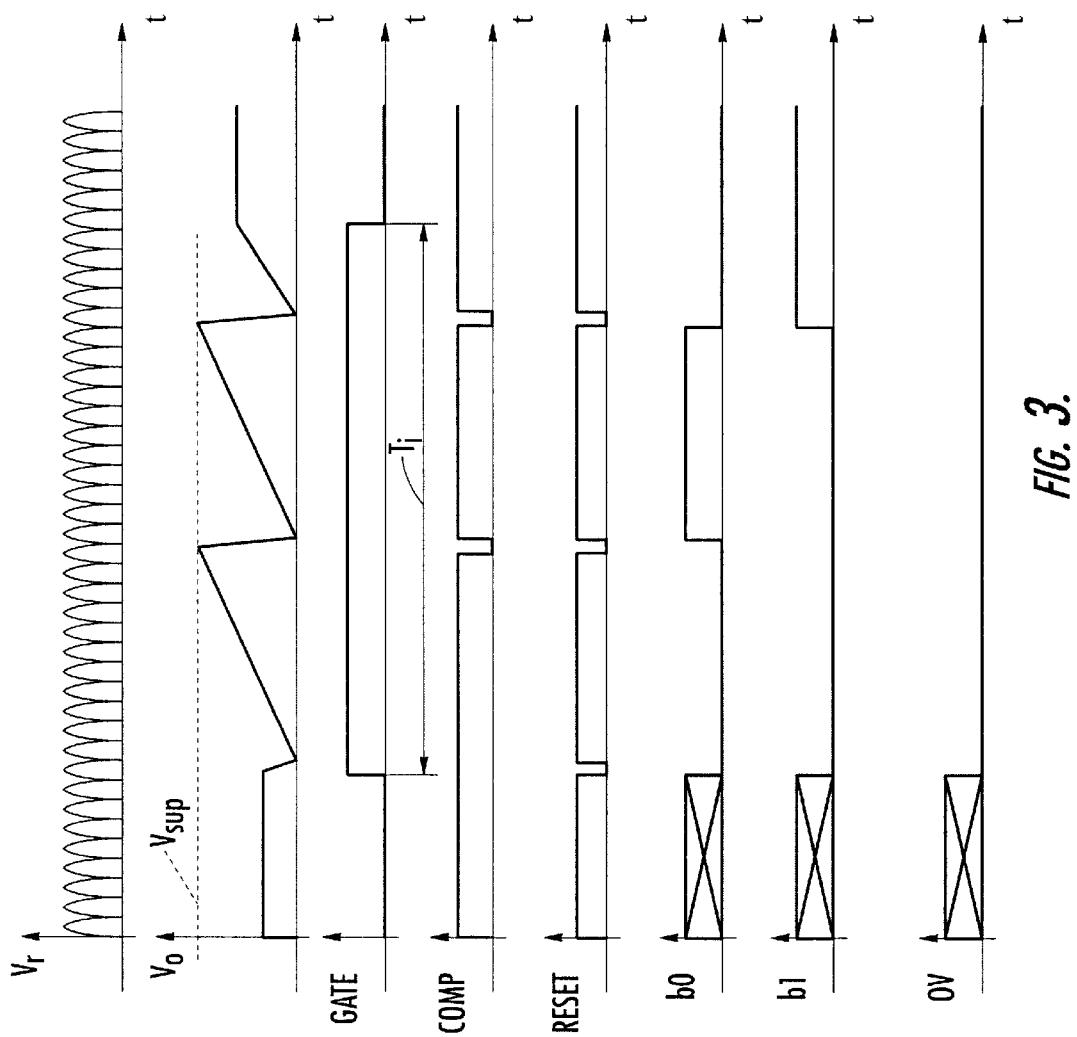
FIG. 3 is a series of graphs indicative of the quantities representative of the operation of the integration circuit stage illustrated in FIG. 2.

The operation of the integration stage 18 as a whole will now be described in detail with reference to FIG. 3. At the beginning of an integration period $T_i$ determined by the signal GATE at a high logic level, both the integrator circuit 22 and the sample/hold circuit 24 are reset. The resetting of the integrator circuit 22 is controlled by a signal RESET which has a pulse (logic zero) of predetermined time duration produced by the multivibrator 36, and which is excited by the active edge of the signal GATE.

The sample/hold circuit 24 is operated in its sampling stage so as to transmit to its output the signal currently present at the output of the integrator $V_o$. At the same time, the content of the counter 38 is cleared. The curves of the signals GATE and RESET against time are shown in the third and fifth graphs of FIG. 3, respectively.

In the example shown, the signal $V_r$ input to the integrator circuit 22 is a rectified sinusoidal signal. The integrator circuit 22 generates a substantially ramp-like output signal $V_o$. When this signal has reached the reference voltage $V_{sup}$ it causes the output signal COMP of the threshold comparator 30 to switch (see the fourth graph of FIG. 3) from a first logic level (high level) to a second logic level (low level).

The trailing edge of the signal COMP increases the content of the counter, and at the same time, brings about the transition of the multivibrator 32 to the quasi-stable state so that the multivibrator 32 sends a resetting pulse to the integrator circuit 22. When resetting has taken place, the signal $V_o$ can start to increase again in dependence on the signal $V_r$, and obviously the output signal COMP of the threshold comparator 30 switches back to the first logic level.

The process described may be repeated any number of times, basically in dependence on the preselected duration of the integration time period $T_i$. The limit of the operation of the control circuit 40 is imposed exclusively by the capacity of the counter 38 used. An overflow condition of the counter may be indicated by a high level signal at the output terminal OV.

At the end of the integration period $T_i$, the control signal GATE switches to a low logic level and the sample/hold circuit 24 stores the voltage value $V_o$ reached at that moment at the output of the integrator circuit 22.

The actual value of the voltage of the output signal $V_{out}$ of the integration stage 18 can thus be derived mathematically from the voltage value $V_o$ reached at the output of the integrator circuit at the end of the integration period (final value) and from the content of the counter. That is, from the number N of times (encoded in binary form by the bits b0, b1, . . . , bn) the signal $V_o$ has covered the entire range available at the output of the integrator circuit during its increasing development. This value is given by the expression:

$$V_{out} = N \times V_{sup} + V_o$$

The variable $V_{sup}$ is the value of the reference voltage of the threshold comparator corresponding to the upper value of the output voltage range of the integrator circuit.

This operation can easily be performed by a conventional processing unit (not shown) arranged to convert the analog signal $V_o$ into a digital signal, and to perform the programmed arithmetic calculation.

In an alternative embodiment, the control circuit 40 may be implemented as a single digital circuit, for example, a finite state machine. This finite state machine is arranged to receive the input signals GATE and COMP, and advantageously generates the resetting signals for the integrator circuit 22, the control signals for the sample/hold circuit 24, and the output signal of the counter 38 while maintaining substantially the same timings as described above.

With the circuit arrangement described by way of example, the output voltage range of the integration stage 18 is thus extended artificially by resetting the integrator circuit 22 each time its output voltage reaches a predetermined limit close to the saturation condition, and by counting the number of resettings.

Alternatively, an approach is provided in which the range is extended by varying the gain of the integrator circuit so as to reverse the characteristic slope of its output signal each time its output voltage reaches a predetermined upper or lower limit close to the saturation condition, and by counting how many times this reversal operation has taken place.

Figure 4:
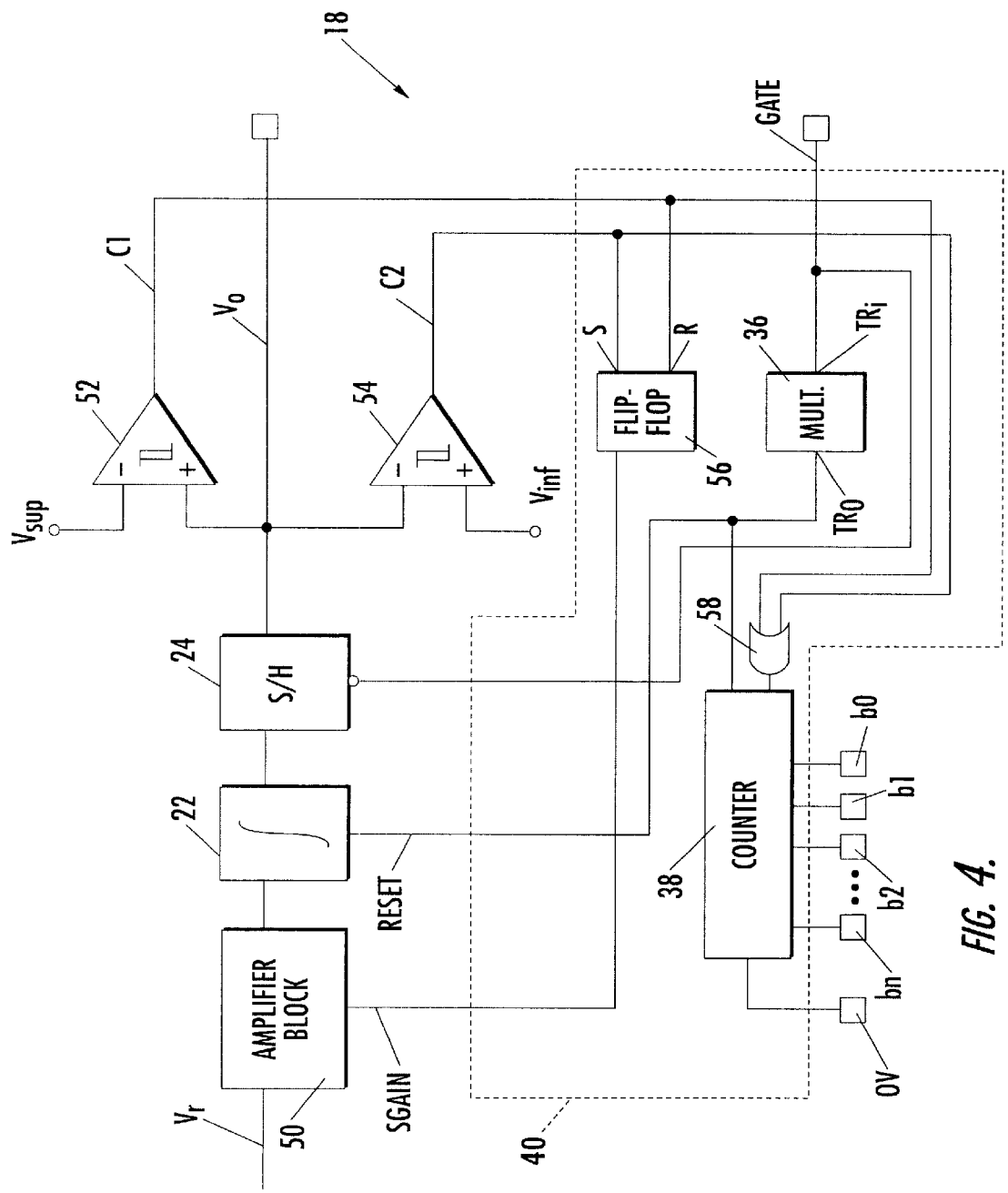
FIG. 4 is a circuit diagram of a second embodiment of an integration circuit stage comprising a circuit according to the present invention.

A second embodiment which can bring about this behavior is described in detail with reference to FIG. 4. Elements identical or functionally equivalent to those illustrated in FIG. 2 have been indicated by the same references already used in the description of the previous embodiment.

The integrator circuit 22 is coupled to an amplifier block 50 with unitary gain. The input of the amplifier block 50 receives the rectified voltage signal Vr that is also input to the integration stage. The integrator circuit 22 is also coupled to the sample/hold circuit 24 which is downstream therefrom, and the control input of which receives the control logic signal GATE from the second input of the integration stage 18.

The task of the amplifier block 50 is simply to transfer the signal $V_r$ input to the integrator circuit 22 in a direct or inverted manner, advantageously establishing a gain of +1 or −1, as required. The block 50 may be formed as a set of two amplifiers with unitary gain of the inverting type and of the non-inverting type, respectively, which can be selected by associated switches. Alternatively, the block 50 may be incorporated in the integrator circuit 22 if it is of the type with switched capacitors so that the selection of a positive or negative gain takes place by suitable driving of the switches provided.

The output of the sample/hold circuit 24 provides the signal $V_o$ which is applied to the non-inverting input of a first threshold comparator 52 which has an inverting input receiving a first reference voltage $V_{sup}$, and to the inverting input of a second threshold comparator 54 which has a non-inverting input receiving a second reference voltage $V_{inf}$. The function of the comparators 52 and 54 is to detect when the voltage of the signal $V_o$ exceeds the value $V_{sup}$ or falls below the value $V_{inf}$, respectively.

The outputs of the first and second threshold comparators 52, 54 are connected, respectively, to the resetting input R and to the control input S of a bistable multivibrator or RS flip-flop 56 which in turn is connected to a control input of the amplifier block 50.

The control logic signal GATE establishes at the control input $TR_i$ of a monostable multivibrator 36, the transition of which from the stable state to the quasi-stable state is induced by the leading edge of the signal GATE. The output $TR_o$ of the multivibrator 36 is coupled to the resetting input of the integrator circuit 22.

A counter 38 is coupled to the output $TR_o$ of the multivibrator 36 by its own resetting input CL and has its own drive input CK coupled to the outputs of the comparators 52, 54 by an OR logic gate 58. The increment of the counter is induced by the leading edge of the signal present at the drive input. A plurality of output terminals b0, b1, . . . , bn, and OV is provided for presenting the content of the counter and for indicating a possible overflow condition thereof, respectively.

Figure 5:
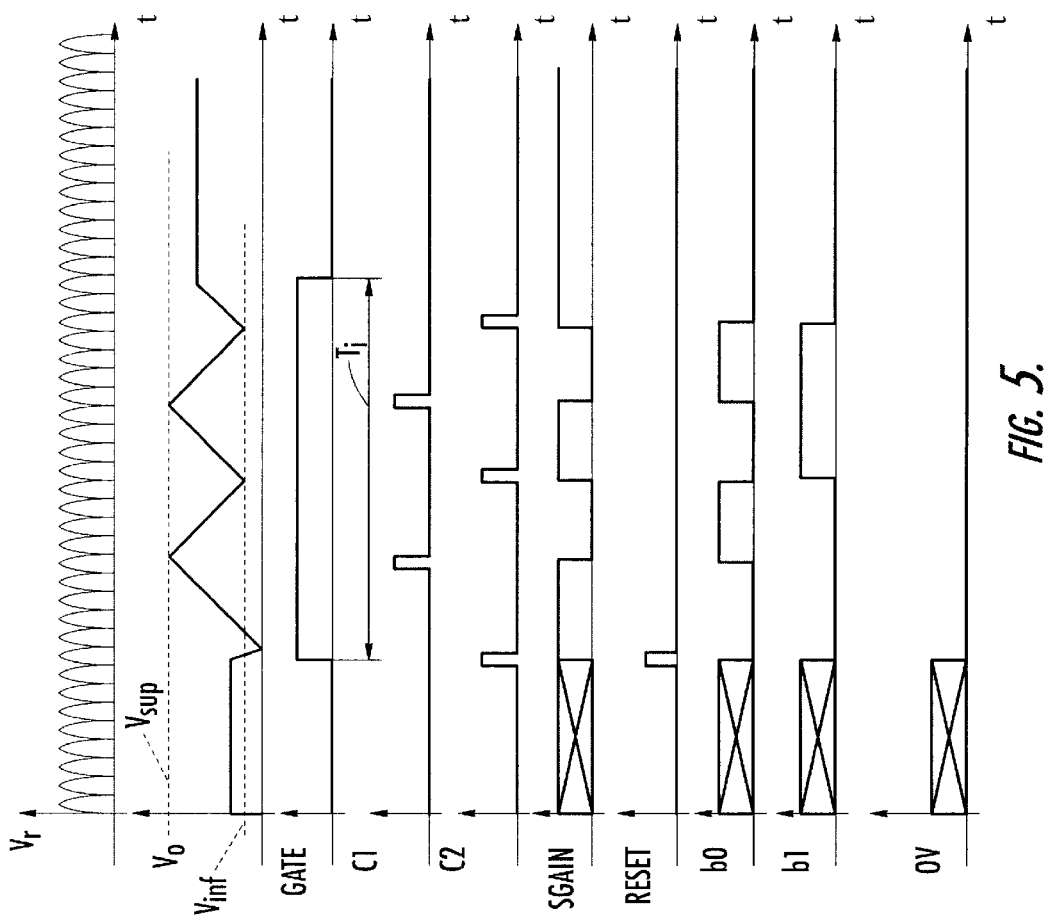
FIG. 5 is a series of graphs indicative of the quantities representative of the operation of the integration circuit stage illustrated in FIG. 4.

The monostable multivibrator 36, the flip-flop 56, and the counter 38 are together indicated as the control circuit 40 of the integrator circuit 22. The operation of the integration stage 18 as a whole, according to this embodiment will now be described in detail with reference to FIG. 5.

At the beginning of an integration period $T_i$, determined by the signal GATE at a high logic level, both the integrator circuit 22 and the sample/hold circuit 24 are reset. The resetting of the integrator circuit is controlled by the signal RESET which has a pulse (logic one) of predetermined time duration. This pulse is produced by the multivibrator 36 excited by the active edge of the signal GATE. The sample/hold circuit 24 is operated in its sampling stage as in the previous embodiment. At the same time, the content of the counter 38 is cleared. The curves of the signals GATE and RESET against time are shown in the third and seventh graphs of FIG. 5, respectively.

As a result of the resetting of the integrator circuit, the output signal $V_o$ initially has a voltage lower than both of the reference voltages $V_{inf}$ and $V_{sup}$, so that the signal C2 output to the threshold comparator 54 is at a high logic level and brings about, by the control input S, the transition of the flip-flop 56 to a first state. In this state, the flip-flop emits a control logic signal SGAIN to the amplifier block 50 such as initially to establish a positive gain value (for example, SGAIN=1).

It will be clear to one skilled in the art, however, that this transition of the signal C2 is not noticed at the drive input CK of the counter 38 since the latter simultaneously receives a resetting signal at the input CL.

In the embodiment shown, the signal $V_r$ input to the integrator circuit 22 is again a rectified sinusoidal signal so that the integrator circuit generates a substantially ramp-like output signal $V_o$. When this signal has reached the first reference voltage $V_{sup}$, it causes the output signal C1 of the threshold comparator 52 to switch (see the fourth graph of FIG. 5) from a first logic level (low level) to a second logic level (high level).

The leading edge of the signal C1 increases the content of the counter 38, and at the same time, brings about by the resetting input R the transition of the flip-flop 56 to a second state in which the flip-flop consequently emits a control logic signal SGAIN to the amplifier block 50 such as to establish a negative gain value (for example, SGAIN=0).

When the gain of the amplifier block has been changed, the signal $V_o$ develops with a decreasing amplitude, again in dependence on the signal $V_r$. The output signal C1 of the threshold comparator 52 switches back to the first logic level. When the signal $V_o$ reaches the second reference voltage $V_{inf}$, it causes the output signal C2 of the threshold comparator 54 to switch (see the fifth graph of FIG. 5) from a first logic level (low level) to a second logic level (high level).

The leading edge of the signal C2 increases the content of the counter 38 again, and at the same time brings about by the control input S the transition of the flip-flop 56 to the first state. This causes the emission of a control signal SGAIN to the amplifier block 50 such as to re-establish a positive gain value (for example, SGAIN=1 again).

The process described above may be repeated any number of times in dependence on the preselected duration of the integration period $T_i$. As in the previous embodiment, the limit of the operation of the control circuit 40 is imposed exclusively by the capacity of the counter 38 used, and any overflow condition is indicated by a high level signal at the output terminal OV. At the end of the integration period $T_i$, the control signal GATE switches to a low logic level and the sample/hold circuit 24 stores the voltage value $V_o$ reached at that moment at the output of the integrator circuit 22.

The actual value of the voltage of the output signal $V_{out}$ of the integration stage 18 can thus be derived mathematically from the voltage value $V_o$ reached at the output of the integrator circuit at the end of the integration period (final value) and from the content of the counter. That is, from the number N of times (encoded in binary form by the bits B0, b1, . . . , bn) the signal $V_o$ has covered the entire range available at the output of the integrator circuit during its increasing and decreasing development. This value is given by the expression:

$$V_{out}=N\times(V_{sup}-V_{inf})+(V_{sup}-V_o)\times\text{SGAIN}+(V_o-V_{inf})\times(1-\text{SGAIN})+V_{inf}$$

The variable $V_{sup}$ is the value of the first reference voltage of the threshold comparator 52 corresponding to the upper value of the output voltage range of the integrator circuit. The variable $V_{inf}$ is the value of the second reference voltage of the threshold comparator 54 corresponding to the lower value of the output voltage range of the integrator circuit. The variable SGAIN is the logic value adopted by the control signal of the amplifier at the end of the integration period. That is, 1 if the gain of the amplifier is positive (+1) and 0 if it is negative (−1).

In the above expression, the last addition takes account of the fact that, initially, when the integrator circuit 22 is reset, its output voltage $V_o$ adopts a substantially zero starting value which is generally different from the value of the second reference voltage value $V_{inf}$. As already described with reference to the previous embodiment, this operation can easily be performed by a conventional processing unit (not shown).

In an alternative embodiment, the control circuit 40 may be implemented as a single digital circuit, for example, a finite state machine arranged to receive the input signals GATE, C1 and C2. The finite state machine advantageously generates the resetting signal for the integrated circuit 22, the control signal for the sample/hold circuit 24, the control signal for the amplifier block 50, and the output signal of the counter 38 while maintaining substantially the same timings as described above.

It is clear from the examples described that, with the use of a circuit according to the invention, it is possible to advantageously use a low supply voltage, for example 5V, for the active elements of the integrator circuit. By using "rail-to-rail" integrator circuits, it is possible to set values of about 0.5V and 4.5V for the reference voltages $V_{inf}$ and $V_{sup}$, respectively, but without limiting the range of the voltage $V_{out}$ which can be reached by the integration stage as a whole to 4V.

Another aspect of the invention is directed to a method for extending an output voltage range of an integrator that receives an input signal and provides an output signal having a voltage that develops monotonically within a range of values. The method comprises comparing a voltage of the output signal with at least one reference voltage corresponding to a limit of the range of values, and driving the integrator after the limit has been reached during development of the output signal within an integration period such that the integrator starts a subsequent integration of the input signal in which the output signal develops again within the same range.

The method further includes counting a number of times the output signal has reached the limit of the range of values so that the subsequent integration has been started. This number is correlated with a number of times the output signal reaches the limit of the range of values. The actual voltage reached at the end of the integration period is calculated from a final output voltage of the output signal and from the number of times the signal reaches the limit of the range of values.

The driving includes resetting the integrator each time the output signal reaches the limit of the range of values. The actual voltage reached at the end of the integration period is calculated in accordance with the equation:

$$V_{out}=N\times V\text{sup}+V_o,$$

wherein N is the number of times the output signal reaches the limit of the range of values, Vsup is at least one reference voltage of a threshold comparator, and Vo is the output signal from the integrator.

The voltage of the output signal is compared with a first reference voltage corresponding to an upper limit of the range of values, and a second reference voltage corresponding to a lower limit of the range of values. The driving may also include inverting a gain of the integrator each time the voltage of the output signal reaches one of the upper and lower limit values to reverse the signal.

The actual voltage reached at the end of the integration period is calculated in accordance with the equation:

$$V_{out}=N\times(V\text{sup}-V\text{inf})+(V\text{sup}-V_o)\times\text{SGAIN}+(V_o-V\text{inf})\times(1-\text{SGAIN})+V\text{inf},$$

wherein Vsup is the first reference voltage of a first threshold comparator circuit, Vinf is a second reference voltage of a second threshold comparator, N is the number of times the output signal reaches the limit of the range of values, Vo is the output signal from the integrator, and SGAIN is a logic value of a gain control signal provided at the end of the integration period for the integrator.

Naturally, the principle of the invention remains the same, the forms of embodiment and details of implementation may be varied widely with respect to those described and illustrated purely by way of non-limiting examples, without thereby departing from the scope of protection of the present invention. In particular, although the examples relate to embodiments in which the output voltage of the integrator circuit adopts exclusively positive values, one skilled in the art will have no problem in appreciating, in the light of the foregoing description, that these embodiments may be extended to a situation in which the integrator circuit has a symmetrical dual supply.

That which is claimed is:

1. A circuit for extending an output voltage range of an integrator that receives an input signal and provides an output voltage that develops monotonically within a range of values, the circuit comprising:
   a control circuit connected to the integrator for control thereof so that within an integration period, each time the output voltage reaches a limit of the range of values, the integrator starts a subsequent integration of the input signal in which the output voltage develops again;
   said control circuit comprising a counter for counting a number of times the output voltage of the integrator has reached the limit, this number being correlated with a number of times the output voltage has covered the range of values so that an actual voltage at the end of the integration period is calculable from a final output voltage and based upon the number of times the output voltage has reached the limit.

2. A circuit according to claim 1, further comprising:
   a comparator for comparing the voltage of the output voltage with at least one reference voltage corresponding to the limit of the range of values, said comparator providing at least one control signal when the output voltage reaches the limit of the range of values during the integration period; and wherein said control circuit further comprises a driver connected to said comparator for driving the integrator so that the subsequent integration of the input signal starts in response to the at least one control signal.

3. A circuit according to claim 2, wherein said comparator comprises a threshold comparator circuit having a non-inverting input for receiving the at least one reference voltage and an inverting input for receiving the output voltage; and wherein said driver comprises a monostable multivibrator circuit having a control input for receiving the at least one control signal and an output for providing a resetting pulse having a predetermined duration each time said comparator detects that the output voltage has reached the at least one reference voltage.

4. A circuit according to claim 3, further comprising a processor connected to outputs of said counter for reading contents thereof and for receiving data related to the final output voltage of the output voltage, said processor calculating the actual voltage of the output voltage reached at the end of the integration period.

5. A circuit according to claim 4, wherein the calculation is in accordance with the equation:

$$Vout = N \times Vsup + Vo,$$

wherein N is the number of times the output voltage reaches the limit of the range of values, Vsup is the at least one reference voltage of said threshold comparator, and Vo is the output voltage from the integrator.

6. A circuit according to claim 2, wherein said comparator comprises:
   a first threshold comparator circuit having an inverting input for receiving a first reference voltage corresponding to an upper limit of the range of values for the output voltage and a non-inverting input for receiving the output voltage, said first threshold comparator circuit providing a first control signal when the output voltage reaches the upper limit of the range of values during the integration period; and
   a second threshold comparator circuit having a non-inverting input for receiving a second reference voltage corresponding to a lower limit of the range of possible values for the output voltage and an inverting input for receiving the output voltage, said second threshold comparator circuit providing a second control signal when the output voltage reaches the lower limit of the range of values during the integration period.

7. A circuit according to claim 6, further comprising a gain control circuit connected to an input of the integrator for controlling a gain thereof, said control circuit inverting its gain based upon the first and second control signals.

8. A circuit according to claim 7, wherein said driver comprises a bistable multivibrator circuit having a control input for receiving the first control signal from said first threshold comparator circuit and a resetting input for receiving the second control signal from said second threshold comparator circuit, and an output for providing a gain control signal to said gain control circuit for inverting its gain each time said first and second threshold comparator circuits detect that the output voltage has reached the upper and lower limits of the range of values.

9. A circuit according to claim 7, wherein said gain control circuit comprises an inverting amplifier circuit with unitary gain and a non-inverting amplifier circuit gain with unitary gain.

10. A circuit according to claim 9, further comprising a processor connected to outputs of said counter for reading contents thereof and for receiving data related to the final voltage of the output voltage, said processor calculating the actual voltage of the output voltage reached at the end of the integration period.

11. A circuit according to claim 10, wherein the calculation is in accordance with the equation:

$$Vout = N \times (Vsup - Vinf) + (Vsup - Vo) \times SGAIN + (Vo - Vinf) \times (1 - SGAIN) + Vinf,$$

wherein Vsup is the first reference voltage of said first threshold comparator circuit, Vinf is the second reference voltage of said second threshold comparator circuit, N is the number of times the output voltage reaches the limit of the range of values, Vo is the output voltage from the integrator, and SGAIN is a logic value of a gain control signal provided by said gain control circuit at the end of the integration period.

12. A circuit according to claim 6, further comprising a resetting circuit having an input for receiving the first control signal from said first threshold comparator circuit, and an output for providing a resetting signal to a resetting input of the integrator.

13. A circuit according to claim 12, wherein said resetting circuit comprise a monostable multivibrator circuit, and wherein the resetting signal includes a resetting pulse having a predetermined duration at the beginning of the integration period.

14. A system for detecting knocking in an internal combustion engine comprising:
   a sensor adjacent cylinders of the internal combustion engine;

a filter connected to said sensor and tuned to a characteristic knock frequency of the internal combustion engine;

an integration stage connected to said filter and comprising an integrator having an input for receiving an input signal and provides an output voltage that develops monotonically within a range of values, a control circuit connected to said integrator for control thereof so that within an integration period, each time the output voltage reaches a limit of the range of values, said integrator starts a subsequent integration of the input signal in which the output voltage develops again, said control circuit comprising a counter for counting a number of times the output voltage of said integrator has reached the limit, this number being correlated with a number of times the output voltage has covered the range of values so that an actual voltage at the end of the integration period is calculable from a final output voltage and based upon the number of times the output voltage has reached the limit.

15. A system according to claim 14, further comprising a knock comparator circuit having a first input for receiving the output voltage from said integration stage and a second input for receiving a signal corresponding to a knock intensity threshold, and an output for providing a signal that corresponds to an output of said sensor.

16. A system according to claim 14, wherein said wherein said integration stage further comprises a comparator for comparing the voltage of the output voltage is with at least one reference voltage corresponding to the limit of the range of values, said comparator providing at least one control signal when the output voltage reaches the limit of the range of values during the integration period; and wherein said control circuit further comprises a driver connected to said comparator for driving the integrator so that the subsequent integration of the input signal starts in response to the at least one control signal.

17. A system according to claim 16, wherein said comparator comprises a threshold comparator circuit having a non-inverting input for receiving the at least one reference voltage and an inverting input for receiving the output voltage; and wherein said driver comprises a monostable multivibrator circuit having a control input for receiving the at least one control signal and an output for providing a resetting pulse having a predetermined duration each time said comparator detects that the output voltage has reached the at least one reference voltage.

18. A system according to claim 17, further comprising a processor connected to outputs of said counter for reading contents thereof and for receiving data related to the final voltage of the output voltage, said processor calculating the actual voltage of the output voltage reached at the end of the integration period.

19. A system according to claim 18, wherein the calculation is in accordance with the equation:

$$Vout = N \times Vsup + Vo,$$

wherein N is the number of times the output voltage reaches the limit of the range of values, Vsup is the at least one reference voltage of said threshold comparator, and Vo is the output voltage from the integrator.

20. A system according to claim 16, wherein said comparator comprises:

a first threshold comparator circuit having an inverting input for receiving a first reference voltage corresponding to an upper limit of the range of values for the output voltage, and a non-inverting input for receiving the output voltage, said first threshold comparator circuit providing a first control signal when the output voltage reaches the upper limit of the range of values during the integration period; and a second threshold comparator circuit having a non-inverting input for receiving a second reference voltage corresponding to a lower limit of the range of possible values for the output voltage, and an inverting input for receiving the output voltage, said second threshold comparator circuit providing a second control signal when the output voltage reaches the lower limit of the range of values during the integration period.

21. A system according to claim 20, further comprising a gain control circuit connected to an input of the integrator for controlling a gain thereof, said control circuit inverting its gain based upon the first and second control signals.

22. A system according to claim wherein said driver comprises a bistable multivibrator circuit having a control input for receiving the first control signal from said first threshold comparator circuit and a resetting input for receiving the second control signal from said second threshold comparator circuit, and an output for providing a gain control signal to said gain control circuit for inverting its gain each time said first and second threshold comparator circuits detect that the output voltage has reached the upper and lower limits of the range of values.

23. A system according to claim 21, wherein said gain control circuit comprises an inverting amplifier circuit with unitary gain and a non-inverting amplifier circuit gain with unitary gain.

24. A system according to claim 23, further comprising a processor connected to outputs of said counter for reading contents thereof and for receiving data related to the final voltage of the output voltage, said processor calculating the actual voltage of the output voltage reached at the end of the integration period.

25. A system according to claim 24, wherein the calculation is in accordance with the equation:

$$Vout = N \times (Vsup - Vinf) + (Vsup - Vo) \times SGAIN + (Vo - Vinf) \times (1 - SGAIN) + Vinf,$$

wherein Vsup is the first reference voltage of said first threshold comparator circuit, Vinf is the second reference voltage of said second threshold comparator, N is the number of times the output voltage reaches the limit of the range of values, Vo is the output voltage from the integrator, and SGAIN is a logic value of a gain control signal provided by said gain control circuit at the end of the integration period.

26. A system according to claim 20, further comprising a resetting circuit having an input for receiving the first control signal from said first threshold comparator circuit, and an output for providing a resetting signal to a resetting input of the integrator.

27. A system according to claim 26, wherein said resetting circuit comprise a monostable multivibrator circuit, and wherein the resetting signal includes a resetting pulse having a predetermined duration at the beginning of the integration period.

28. A method for extending an output voltage range of an integrator that receives an input signal and provides an output signal having a voltage that develops monotonically within a range of values, the method comprising:

comparing a voltage of the output signal with at least one reference voltage corresponding to a limit of the range of values;

driving the integrator after the limit has been reached during development of the output signal within an integration period such that the integrator starts a subsequent integration of the input signal in which the output signal develops again within the same range the driving comprising counting a number of times the output signal has reached the limit of the range of values so that after the subsequent integration has been started, the number being correlated with a number of times the output signal reaches the limit of the range of values, and calculating the actual voltage reached at the end of the integration period from a final output voltage of the output signal and from the number of times the signal reaches the limit of the range of values.

29. A method according to claim 28, wherein driving includes resetting the integrator each time the output signal reaches the limit of the range of values.

30. A method according to claim 29, wherein the actual voltage reached at the end of the integration period is calculated in accordance with the equation:

$$Vout = N \times Vsup + Vo,$$

wherein N is the number of times the output signal reaches the limit of the range of values, Vsup is at least one reference voltage of a threshold comparator, and Vo is the output signal from the integrator.

31. A method according to claim 28, wherein the voltage of the output signal is compared with a first reference voltage corresponding to an upper limit of the range of values and a second reference voltage corresponding to a lower limit of the range of values.

32. A method according to claim 31, wherein driving includes inverting a gain of the integrator each time the voltage of the output signal reaches one of the upper and lower limit values to reverse the signal.

33. A method according to claim 32, wherein the actual voltage reached at the end of the integration period is calculated in accordance with the equation:

$$Vout = N \times (Vsup - Vinf) + (Vsup - Vo) \cdot SGAIN + (Vo - Vinf) \times (1 - SGAIN) + Vinf,$$

wherein Vsup is the first reference voltage of a first threshold comparator circuit, Vinf is a second reference voltage of a second threshold comparator, N is the number of times the output signal reaches the limit of the range of values, Vo is the output signal from the integrator, and SGAIN is a logic value of a gain control signal provided at the end of the integration period for the integrator.

* * * * *

UNITED STATES PATENT AND TRADEMARK OFFICE
CERTIFICATE OF CORRECTION

PATENT NO.    : 6,407,610 B2
DATED         : June 18, 2002
INVENTOR(S)   : Mazzucco et al.

It is certified that error appears in the above-identified patent and that said Letters Patent is hereby corrected as shown below:

<u>Column 11,</u>
Lines 29-30, delete "A system according to claim 14, wherein said wherein said integration stage further comprises . . ." substitute -- A system according to claim 14, wherein said integration stage further comprises . . . --
Line 31, delete "comparing the voltage of the output voltage is with at least" substitute -- comparing the voltage of the output voltage with at least --

Signed and Sealed this

Fourth Day of February, 2003

JAMES E. ROGAN
*Director of the United States Patent and Trademark Office*